United States Patent [19]

Brown

[11] Patent Number: 4,860,349

[45] Date of Patent: Aug. 22, 1989

[54] TELEPHONE MEMORY CONTROLLER ARRANGEMENT

[75] Inventor: Anthony K. D. Brown, Kanata, Canada

[73] Assignee: Northern Telecom Limited, Montreal, Canada

[21] Appl. No.: 276,123

[22] Filed: Nov. 25, 1988

[51] Int. Cl.$^4$ .................................. H04M 1/274
[52] U.S. Cl. ................................. 379/356; 379/355
[58] Field of Search ............................. 379/356, 355

[56] References Cited

U.S. PATENT DOCUMENTS 4,243,845  1/1981  Feinberg et al. .................... 379/355

Primary Examiner—Stafford D. Schreyer
Attorney, Agent, or Firm—Philip W. Jones

[57] ABSTRACT

Telephone numbers are stored and retrieved for automatic redialling by an arrangement that includes a memory map of bits. Each bit is uniquely associated with a respective redial key and a respective memory bank of the arrangement. Each memory bank has a capacity sufficient to store a telephone number. Actuation of a predefined one of the redial keys always results in redialling of the last telephone number stored. If one of the other redial keys is actuated after telephone dialling, a memory management unit of the arrangement assigns a first value to the bit uniquely associated with that key and an available memory bank. Subsequent actuation of that other key then results in automatic redialling of the telephone number associated with that key. In a further form of the invention, one of the other redial keys may be actuated during, rather than after, dialling of the telephone number. In such case, subsequent actuation of that other key results in redialling of the telephone number that was stored prior to the previous actuation of that key.

9 Claims, 3 Drawing Sheets

|  | MEMORY MANAGEMENT RAM ||||
|  | BANK 1 | BANK 2 | BANK 3 | BANK 4 |
| --- | --- | --- | --- | --- |
| REPERTORY KEY 1 | 0 | 0 | 0 | 0 |
| REPERTORY KEY 2 | 0 | 0 | 0 | 0 |
| REPERTORY KEY 3 | 0 | 0 | 0 | 0 |
| LNR KEY | 1 | 0 | 0 | 0 |

FIG. 2

|  | MEMORY MANAGEMENT RAM ||||
|  | BANK 1 | BANK 2 | BANK 3 | BANK 4 |
| --- | --- | --- | --- | --- |
| REPERTORY KEY 1 | 0 | 0 | 0 | 0 |
| REPERTORY KEY 2 | 1 | 0 | 0 | 0 |
| REPERTORY KEY 3 | 0 | 0 | 0 | 0 |
| LNR KEY | 1 | 0 | 0 | 0 |

FIG. 3

|  | MEMORY MANAGEMENT RAM ||||
|  | BANK 1 | BANK 2 | BANK 3 | BANK 4 |
| --- | --- | --- | --- | --- |
| REPERTORY KEY 1 | 0 | 0 | 0 | 0 |
| REPERTORY KEY 2 | 1 | 0 | 0 | 0 |
| REPERTORY KEY 3 | 0 | 0 | 0 | 0 |
| LNR KEY | 0 | 1 | 0 | 0 |

FIG. 4

|  | MEMORY MANAGEMENT RAM | | | |
| --- | --- | --- | --- | --- |
|  | BANK 1 | BANK 2 | BANK 3 | BANK 4 |
| REPERTORY KEY 1 | 0 | 0 | 0 | 0 |
| REPERTORY KEY 2 | 1 | 0 | 0 | 0 |
| REPERTORY KEY 3 | 0 | 0 | 0 | 0 |
| LNR KEY | 0 | 1 | 0 | 0 |
| REGISTER | 1 | 0 | 0 | 0 |

FIG. 5

|  | MEMORY MANAGEMENT RAM | | | |
| --- | --- | --- | --- | --- |
|  | BANK 1 | BANK 2 | BANK 3 | BANK 4 |
| REPERTORY KEY 1 | 0 | 0 | 0 | 0 |
| REPERTORY KEY 2 | 1 | 0 | 0 | 0 |
| REPERTORY KEY 3 | 0 | 1 | 0 | 0 |
| LNR KEY | 0 | 0 | 1 | 0 |
| REGISTER | 0 | 1 | 0 | 0 |

FIG. 6

TELEPHONE MEMORY CONTROLLER ARRANGEMENT

This invention relates to a memory controller arrangement for a telephone and, more particularly, to an arrangement for controlling the storing and retrieving of telephone numbers for redialling.

Telephone sets are presently available which provide the capability of automatic redialling of either the last number dialled or a previously-saved number. Specific locations are generally allocated in a semiconductor memory for the purpose of storing each digit of a dialled sequence. The usual process for storing a number is to transfer the contents of a buffer memory containing the most recently-dialled number into the specific memory locations. When the user wishes to redial the stored number, they initiate an operation which accesses the specific memory locations for the required dialling sequence.

Use of a buffer memory and subsequent transfer to specific memory locations suffers from at least two disadvantages. Firstly, the transfer process takes time which in low power telephone applications can represent a perceivable delay to the user and may cause an interruption in the flow of manual dialling. This drawback generally limits the use of this storage scheme to the storing of complete numbers, and the storage only occurs after the dialling of the complete number sequence. A second disadvantage is that the process requires an additional read/write mechanism for memory data transfer between the buffer memory and the specific memory locations, the additional mechanism requiring valuable silicon chip area.

It is an object of this invention to provide a memory management technique which avoids the foregoing disadvantages, and which in addition allows for the storage and redialling of only a portion of a dialled telephone number.

The invention is a memory storage assembly for use in telephones having automatic redial capability. The assembly comprises in one form a series of memory banks each capable of retaining a dialled telephone number, a series of redial actuators, and a memory management unit comprised in part by a series of binary cells equal in number to the number of redial actuators multiplied by the number of memory banks. Each of the binary cells is uniquely associated with a respective one of the redial actuators and a respective one of the memory banks. A first value is placed into a binary cell to indicate an association between a respective one of the redial actuators and a respective one of the memory banks. The memory management unit selects one o the memory banks at the commencement of the dialling of each telephone number for the storage of that number and places a first value into the binary cell uniquely associated with that memory bank and with a predefined one of the redial actuators. The actuation of any other of the redial actuators after the dialling of the telephone number results in the memory management unit placing a first value into the binary cell uniquely associated with the selected memory bank and the other redial actuator. Following a return to the on-hook state of a telephone having the memory storage assembly, the actuation of the predefined one of the redial actuators during the following off-hook state of the telephone results in the redialling of the last telephone number dialled. The alternate actuation of any other one of the redial actuators during that off-hook state results in the redialling of the telephone number in that memory bank which has a first value in the binary cell uniquely associated with that any other one of the redial actuators.

In another form, the memory storage assembly comprises a memory management unit modified from the assembly of the first form in that it comprises an additional set of binary cells equal in number to the number of memory banks. Each of the additional binary cells is uniquely associated with a respective one of the memory banks. Actuation of one of the any other of the redial actuators during the dialling of the telephone number results in the memory management unit placing a first value into the binary cell uniquely associated with the selected memory bank and the one redial actuator. That actuation also results in the memory management unit placing a first value into the additional binary cell that is uniquely associated with the selected memory bank. Following a return to the on-hook state of a telephone having the memory storage assembly in this form, the actuation of the predefined one of the redial actuators during the following off-hook state of the telephone results in the redialling of the whole of the last number dialed. The alternate actuation of the one redial actuator results in the redialling of that portion of the last telephone number that was dialled prior to the previous actuation of the one redial actuator. Each memory bank may be comprised of a series of memory cells, each cell being capable of retaining a digital representation of a digit of a telephone number.

The invention will next be more fully described by means of two embodiments utilizing the accompanying figures in which:

FIG. 2 is a first table of values for the array of binary cells in a simple embodiment of the invention, the simple embodiment lacking the register shown in FIG. 1.

FIG. 3 is a second table of values for the array of binary cells in the simple embodiment of the invention.

FIG. 4 is a third table of values for the array of binary cells in the simple embodiment of the invention.

FIG. 5 is a first table of values for the array of binary cells in an enhanced embodiment of the invention, the enhanced embodiment including the register shown in FIG. 1.

FIG. 6 is a second table of values for the array of binary cells in the enhanced embodiment of the invention.

Figure 1:
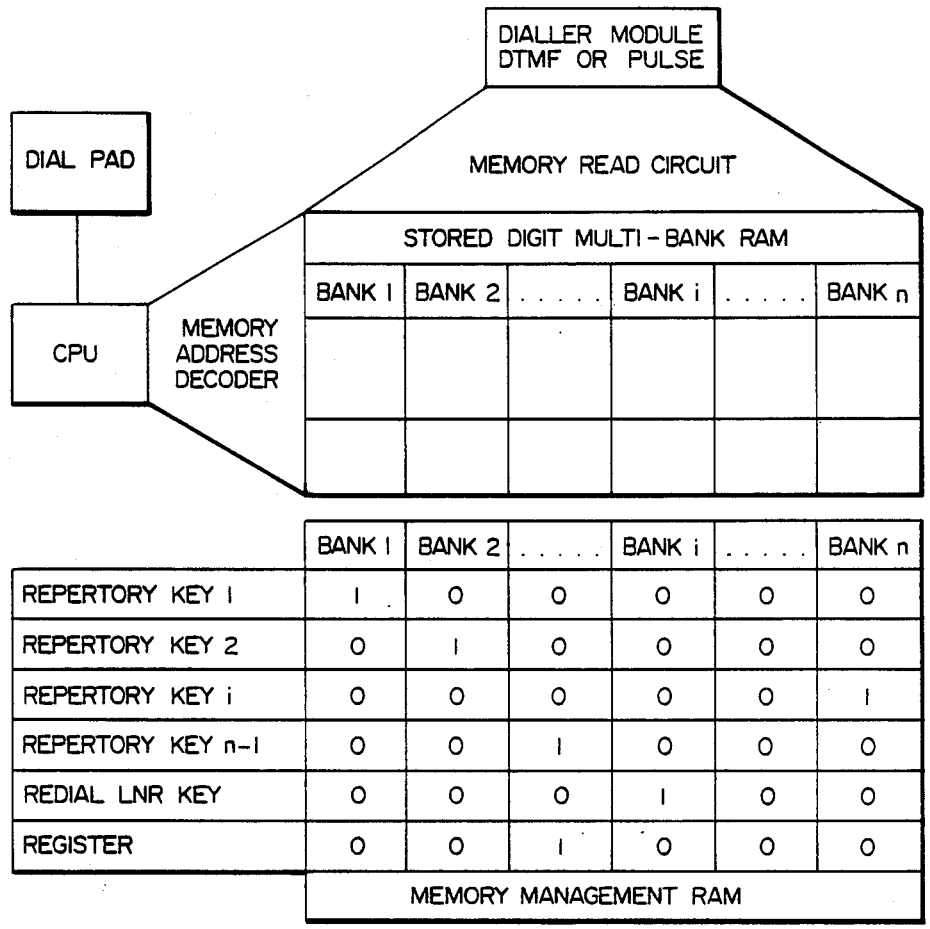
FIG. 1 is a schematic diagram of the overall memory controller arrangement, the figure including an array of binary cells each of which represents a unique association between one of the illustrated memory banks and one of the illustrated keys or register.

As depicted in the overall schematic diagram of FIG. 1, the memory controller arrangement of the invention is applicable to the storing of between two and 'n' telephone numbers for redialling; the upper limit is constrained only by the requirements of the marketplace.

Each 'Bank' shown in FIG. 1 is a memory bank comprising a number of memory cells; a typical number of cells in a bank would be 24. Each memory cell contains a nibble (4 bits), and each nibble is capable of representing in binary the numbers 0 to 9, two symbols, as well as four alternate codes. One of the alternate codes could provide a means for allowing automatic dial tone detection to be imbedded in the stored telephone number. Another possibility for using some of the alternate codes is as an indicator of the type of dialling to be used with the stored number, i.e. pulse dialling or dual tone multifrequency (DTMF); imbedding such code within the number could provide automatic switching between the types of dialling during the course of the dialling. One of the alternate codes is always used as a Null code to signal to the dialling equipment that no more numbers are stored in the particular memory bank being used for the dialling process.

Each 'Repertory Key' in FIG. 1 is associated with a pushbutton or a similar device on the face of the telephone for actuating a redial of a stored telephone number. The Memory Management RAM (MM RAM) of FIG. 1 has an array of binary cells, each capable of assuming either the value 1 or the value 0 and each representing a unique association between one of the memory banks and one of the Repertory Keys. The 'Register' represents a set of additional binary cells, one additional binary cell being associated with each of the memory banks. The additional binary cells are utilized in an enhanced embodiment of the memory controller arrangement, and their purpose will be described subsequently. A telephone number entered through the dial pad on the face of the telephone is stored in a memory bank selected by a CPU and memory address decoding, the digits comprising the telephone number being stored into consecutive memory cells in the selected memory bank.

A simple embodiment of the memory controller arrangement will first be described, followed by the description of an enhanced embodiment.

The simple embodiment to be described has three Repertory Keys and a LNR (Last Number Redial) Key and also has four memory banks, as depicted in FIGS. 2, 3 and 4; the number of memory banks is always equal to the total number of keys. Upon the power-up of a telephone new from the factory that embodies the invention, the MM RAM contains all 0's. Following the initiation of the first dialling sequence on the telephone, the circuit selects the first column of binary cells from the left in the MM RAM (that column representing the first memory bank, i.e. Bank 1), and writes a 1 into the binary cell that corresponds to the LNR Key row in that column. The state of the MM RAM is then as depicted in FIG. 2. The user of the telephone then completes the dialling of the phone number and may, or may not, depress one of the Repertory Keys during the subsequent telephone conversation before placing the telephone on-hook. As a digit of the telephone number is entered by means of the dial pad of FIG. 1, the circuit enters the digit sequentially into a memory cell in Bank 1 and enters a NULL code into the next memory cell. As the following digit is entered, it overwrites the NULL code and a NULL code is written into the following memory cell. In this way, the NULL code is always positioned in the memory cell which follows the last cell filled with a digit or alternate code.

Assuming that the user does not actuate one of the Repertory Keys during the telephone conversation, the state of the MM RAM after the telephone has been placed on-hook will remain as depicted in FIG. 2. After the telephone is again placed in the off-hook condition, the user may actuate the LNR Key which will result in the telephone number stored in Bank 1 being automatically redialled utilizing the Memory Read Circuit shown in FIG. 1. If the user does actuate one of the Repertory Keys, for instance Key 2, during the telephone conversation, the circuit places a 1 into that binary cell of the MM RAM which uniquely corresponds to Bank 1 and Key 2. The state of the MM RAM at that point will be as depicted in FIG. 3. Following an on-hook, off-hook sequence on the phone, actuation of any of the Repertory Keys will result in the circuit examining the MM RAM to determine what, if any, binary cell in the row corresponding to that key has the value 1. In the example depicted in FIG. 3, the circuit finds that the binary cell corresponding to Bank 1 has the value 1, and proceeds to redial the telephone number stored in Bank 1. Actuation of the LNR Key at that point would have the same result. If the user should begin a manual dialling sequence, the value 1 that uniquely corresponds to the LNR Key and Bank 1 is replaced with the value 0, and the circuit searches for a column of binary cells (corresponding to a memory bank), filled only with 0's in the MM RAM; once the circuit locates such a column, it enters a 1 into the binary cell uniquely associated with that memory bank and the LNR Key. In the case of a new telephone, Bank 2 would be selected by the circuit for the use of the LNR Key, and the state of the MM RAM would then be as depicted in FIG. 4. Because the number of memory banks is always one greater than the number of Repertory Keys, one of the memory banks will always be available to the LNR Key.

A similar series of steps would occur with the second telephone call as with the first. If no Repertory Key was actuated during the second call, the state of the MM RAM when the telephone was placed on-hook would remain as depicted in FIG. 4. If, however, a second Repertory Key, for instance Key 3, were actuated during the second call, then the binary cell uniquely corresponding to Bank 2 and Key 3 would be changed to the value 1; the values in the remainder of the MM RAM would remain as depicted in FIG. 4.

The enhanced embodiment of the memory controller arrangement differs from the simple embodiment in that the Register of additional binary cells shown in FIGS. 1, 5 and 6 is added to the MM RAM. No key is involved with the Register; its actions are controlled by the circuit, and are invisible to the telephone user. One binary cell is added to the MM RAM for each of the memory banks. The additional binary cells are utilized in an arrangement for the storage of only a portion of a telephone number.

Assume that a dialled telephone number consists of the international dialling code, the country code, the area code, the local number, and finally an extension number. Further assume that a number of different extension numbers at the same local number are called on a fairly frequent basis. Then it would be advantageous to have an arrangement whereby actuation of one of the Repertory Keys results in automatic redialling of the telephone number with the exclusion of the extension number. The additional binary cells create a MM RAM which can handle this situation.

Once the telephone is taken off the hook and dialling commences with the enhanced embodiment, the circuit searches for a column in the MM RAM in which none of the binary cells contain the value 1; that step is the same as with the simple embodiment. Once a column (for instance, the one associated with Bank 1) is selected, the value 1 is placed into that binary cell of the MM RAM which is uniquely associated with that column and the LNR Key. Using the example, assume that the international, country and area codes and the local number are then dialled, and then Repertory Key 2 actuated. At that point, the circuit enters the value 1 into the binary cell uniquely associated with Bank 1 and Repertory Key 2, and enters the value 1 into the additional binary cell associated with Bank 1. The circuit also changes the value 1 in the binary cell uniquely associated with Bank 1 and the LNR Key into the value ∅, i.e. it resets that binary cell, and searches for another column of the MM RAM which is filled only with the value ∅. Once that other column (for instance, the column associated with Bank 2) is located, the binary cell that corresponds to the LNR Key in that column is set, i.e. the value 1 is entered in that cell. At that point, the contents of the MM RAM is as depicted in FIG. 5. All of these changes in the MM RAM are invisible to the telephone user, who continues with the dialling of the extension number.

Once the telephone call is completed and the telephone placed on the hook, the user is then in a position to have the telephone automatically redial either the complete number of the previous call or the complete number with the exception of the extension number (in the latter case, a new extension number can be added manually at the completion of the automatic redialling). If the complete phone number is to be redialled, the user takes the phone off-hook and actuates the LNR Key. The circuit then goes through an algorithm in which it studies the contents of the additional binary cells (the ones in the Register row) for the value 1. With the MM RAM of FIG. 5, the value 1 is in the column corresponding to Bank 1. The telephone number stored in that memory bank, i.e. the number up to and including the local number followed by a NULL code, is then redialled. The algorithm then causes a search to be undertaken for the MM RAM column that has the value 1 associated with the LNR Key row, which in our example corresponds to Bank 2. Then contents of that memory bank, i.e. the extension number followed by a NULL code, is then redialled. If only the first portion of the telephone number is to be redialled, Repertory Key 2 is actuated. That action has the same effect as with the simple embodiment, namely, the MM RAM is analyzed to determine which column has the value 1 in the row corresponding to Key 2. The contents of the memory bank corresponding to that column are then used for the automatic redialling. A new extension number may be manually added at the conclusion of the automatic redialling.

If a phone number is manually dialled after the telephone is taken off-hook (instead of Repertory Key 2 or the LNR Key being actuated), the circuit resets the value 1 that is stored in the additional binary cell in the column corresponding to Bank 1. If Repertory Key 3 is actuated after only a portion of the telephone number has been dialled, the circuit changes the contents of the MM RAM to the values shown in FIG. 6. After an on-hook, off-hook sequence, either the portion of the previous number or the whole previous number can be automatically redialled by the actuation of either Repertory Key 3 or the LNR Key, respectively. If no key is depressed during the telephone call, the option still exists for depressing the LNR Key after the next on-hook, off-hook sequence; in that case, all of the digits of the previously-dialled number are automatically redialled.

The overhead presented by the MM RAM is small in comparison to the total size of the memory bank RAM to which the MM RAM can point. For instance, a telephone utilizing the enhanced embodiment of the invention and capable of storing five telephone numbers would require 24×4×6 bits of memory for dialled digit storage and also require 7×6 bits of MM RAM. This equates to an overhead of 7.29 percent.

I claim:

1. A memory storage assembly for use in telephones having automatic redial capability, the storage assembly comprising:
    (a) a series of memory banks, each bank being capable of retaining a dialled telephone number;
    (b) a series of redial actuators; and,
    (c) a memory management unit comprised in part by a series of binary cells equal in number to the number of redial actuators multiplied by the number of memory banks, each binary cell being uniquely associated with a respective one of the redial actuators and a respective one of the memory banks, a first value being placed into a binary cell to indicate an association between a respective one of the redial actuators and a respective one of the memory banks, the memory management unit selecting one of the memory banks at the commencement of the dialling of each telephone number for the storage of that number and placing a first value into the binary cell uniquely associated with that memory bank and with a predefined one of the redial actuators, actuation of any other of the redial actuators after the dialling of the telephone number resulting in the memory management unit placing a first value into the binary cell uniquely associated with the selected memory bank and the other redial actuator;
    whereby, following the return to the on-hook state of a telephone having the memory storage assembly, the actuation of the predefined one of the redial actuators during the following off-hook state of the telephone results in the redialling of the last telephone number dialed, and the alternate actuation of any other one of the redial actuators during that off-hook state results in the redialling of the telephone number in that memory bank which has a first value in the binary cell uniquely associated with that any other one of the redial actuators.

2. A memory storage assembly as in claim 1, wherein the memory management unit is modified so as to be comprised of an additional set of binary cells equal in number to the number of memory banks, each one of the additional binary cells being uniquely associated with a respective one of the memory banks, and wherein actuation of one of the any other of the redial actuators during the dialling of the telephone number results in the memory management unit placing a first value into the binary cell uniquely associated with the selected memory bank and the one redial actuator and also placing a first value into that additional binary cell that is uniquely associated with the selected memory bank;
    whereby, following the return to the on-hook state of a telephone having the memory storage assembly with the modified memory management unit, the actuation of the predefined one of the redial actuators during the following off-hook state of the telephone results in the redialling of the whole of the last number dialed, and the alternate actuation of the one redial actuator results in the redialling of that portion of the last telephone number that was dialled prior to the previous actuation of the one redial actuator.

3. A memory storage assembly as in claim 1, wherein each memory bank is comprised of memory cells, and each memory cell is capable of retaining a digital representation of a digit of a telephone number.

4. A memory storage assembly as in claim 1, 2 or 3, wherein the number of memory banks and the number of redial actuators are each equal to four.

5. A memory storage assembly for use in telephones having automatic redial capability, the storage assembly comprising:
  (a) a series of banks of memory cells, each cell being capable of retaining a digital representation of a digit of a telephone number;
  (b) a series of redial actuators equal in number to the number of banks of memory cells; and,
  (c) a memory management unit for assigning in a sequential manner each of the banks of memory cells to a respective selected redial actuator, the management unit being comprised in part by a series of binary cells each capable of being either set or reset, the number of binary cells being equal to the square of the number of redial actuators, each of the binary cells being uniquely associated with a different one of the positions in a two-dimensional array in which the redial actuators form one dimension and the banks of memory cells form the other dimension, the memory management unit being capable of selecting one of the banks of memory cells when a telephone off-hook condition is detected and of altering the state of the binary cell uniquely associated with that bank and a predefined one of the redial actuators, the memory management unit also being capable of altering the state of the binary cell uniquely associated with that bank and one of the other redial actuators when the one of the other redial actuators is actuated following the dialling of a telephone number;
  whereby, following an on-hook condition of a telephone having the memory storage assembly, the actuation of the predefined one of the redial actuators during the following off-hook condition of the telephone causes the last number dialed to be redialled, and the actuation of any other one of the redial actuators during that off-hook condition causes a redialling of the number in that bank of memory cells which has an altered state in the binary cell uniquely associated with the any other one of the redial actuators.

6. A memory storage assembly as in claim 5, and further comprising an additional set of binary cells in the memory management unit, each of the additional binary cells being uniquely associated with a respective one of the banks of memory cells, the memory management unit being capable when an actuation of one of the other redial actuators is sensed during the dialling of a telephone number of altering the state of the binary cell uniquely associated with the selected bank of memory cells and the one redial actuator and of altering the state of that additional binary cell that is uniquely associated with the selected bank of memory cells;
  whereby, during an off-hook condition subsequent to an on-hook condition of a telephone having the memory storage assembly, the actuation of the predefined redial actuator results in the redialling of the whole of the last number dialed, and the actuation of the one redial actuator results in the redialling of that portion of the last number dialed that was dialled prior to the previous actuation of the one redial actuator.

7. A memory storage assembly as in claim 3, 5 or 6, wherein each memory cell is comprised of four binary elements, each cell being thereby capable of assuming any one of sixteen values.

8. A memory storage assembly as in claim 3, 5 or 6, wherein each memory cell is comprised of four binary elements, each cell being thereby capable of assuming any one of sixteen values, wherein one of those values is a null indicator adapted during dialing of a telephone number in a bank to signal the memory storage assembly of the end of the telephone number, and wherein after loading of a telephone number into a bank of memory cells the memory cell next sequentially addressed in the bank is loaded with a null indicator.

9. A memory storage assembly as in claim 3, 5 or 6, wherein each memory cell is comprised of four binary elements and wherein each bank is comprised of twenty-four memory cells.

* * * * *